United States Patent
Jia et al.

(10) Patent No.: US 9,306,640 B2
(45) Date of Patent: Apr. 5, 2016

(54) SELECTING A MODULATION AND CODING SCHEME FOR BEAMFORMED COMMUNICATION

(75) Inventors: Zhanfeng Jia, Belmont, CA (US); Shu Du, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 185 days.

(21) Appl. No.: 13/607,222

(22) Filed: Sep. 7, 2012

(65) Prior Publication Data

US 2014/0071838 A1    Mar. 13, 2014

(51) Int. Cl.
*H04W 4/00* (2009.01)
*H04B 7/04* (2006.01)
*H04L 1/00* (2006.01)
*H04B 7/06* (2006.01)

(52) U.S. Cl.
CPC ............... *H04B 7/04* (2013.01); *H04L 1/0016* (2013.01); *H04L 1/0021* (2013.01); *H04L 1/0033* (2013.01); *H04B 7/0617* (2013.01); *H04L 1/0026* (2013.01)

(58) Field of Classification Search
USPC .......................................... 370/252, 329, 465
See application file for complete search history.

(56) References Cited

U.S. PATENT DOCUMENTS

| | | | |
|---|---|---|---|
| 6,369,756 B1 * | 4/2002 | Wang et al. ................... | 342/367 |
| 7,333,556 B2 | 2/2008 | Maltsev et al. | |
| 7,672,674 B2 | 3/2010 | Mahany et al. | |
| 8,611,288 B1 * | 12/2013 | Zhang et al. ................... | 370/329 |
| 2002/0101913 A1 | 8/2002 | Masters et al. | |
| 2003/0043778 A1 | 3/2003 | Luschi et al. | |

(Continued)

FOREIGN PATENT DOCUMENTS

EP    1422898 A1    5/2004

OTHER PUBLICATIONS

IEEE P802.11ad/D5.0, Sep. 2011, Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 601 pages.

(Continued)

*Primary Examiner* — Edan Orgad
*Assistant Examiner* — Sithu Ko
(74) *Attorney, Agent, or Firm* — Dang M. Vo

(57) ABSTRACT

In adaptive modulation and coding scheme (MCS) selection for directional antenna systems, at least one table is defined that maps different ranges of signal quality values to different sets of MCS parameters. In some implementations, each range corresponds to a separate table (e.g., a given table will include the MCS and other information for that range of signal quality values). In the event an abrupt change in signal quality is detected (e.g., a change in received signal strength greater than or equal to a defined threshold), instead of using a conventional rate selection algorithm, a new MCS is selected through the use of the ranges from the table(s). In this way, a relatively large change in MCS may be accommodated, if warranted by the change in signal quality.

32 Claims, 9 Drawing Sheets

(56) References Cited

U.S. PATENT DOCUMENTS

| | | | |
|---|---|---|---|
| 2005/0122912 A1* | 6/2005 | Jeon et al. | 370/252 |
| 2005/0136844 A1* | 6/2005 | Giesberts et al. | 455/67.13 |
| 2006/0067418 A1* | 3/2006 | Girardeau et al. | 375/265 |
| 2007/0097852 A1 | 5/2007 | Thesling | |
| 2008/0165875 A1* | 7/2008 | Mundarath et al. | 375/262 |
| 2008/0167075 A1* | 7/2008 | Kurtz et al. | 455/561 |
| 2008/0267108 A1* | 10/2008 | Zhang et al. | 370/312 |
| 2009/0080351 A1* | 3/2009 | Ryu et al. | 370/312 |
| 2009/0116569 A1* | 5/2009 | Jin | 375/260 |
| 2010/0135178 A1 | 6/2010 | Aggarwal et al. | |
| 2010/0166098 A1* | 7/2010 | Luz et al. | 375/267 |
| 2010/0278160 A1 | 11/2010 | Park et al. | |
| 2011/0019775 A1 | 1/2011 | Ruscitto et al. | |
| 2011/0044305 A1* | 2/2011 | Christoffersson et al. | 370/338 |
| 2011/0150111 A1* | 6/2011 | Oyman et al. | 375/260 |
| 2012/0063336 A1 | 3/2012 | Shany et al. | |
| 2012/0294231 A1 | 11/2012 | Finlow-Bates et al. | |
| 2012/0315918 A1 | 12/2012 | Kadous | |

OTHER PUBLICATIONS

Xia, et al., "Open-Loop Link Adaptation for Next-Generation IEEE 802.11n Wireless Networks," IEEE Transactions on Vehicular Technology. Sep. 2009. vol. 58, No. 7, pp. 3713-3725.

Partial International Search Report—PCT/US2013/058330—ISA/EPO—Feb. 6, 2014.

Fang S.H., et al., "Accurate Indoor Location Estimation by Incorporating the Importance of Access Points in Wireless Local Area Networks", GLOBECOM 2010, 2010 IEEE Global Telecommunications Conference, IEEE, Piscataway, NJ, USA, Dec. 6, 2010, pp. 1-5, XP031846816, ISBN: 978-1-4244-5636-9.

International Search Report and Written Opinion—PCT/US2013/058330—ISA/EPO—May 8, 2014.

Kushki A et al., "Kernel-Based Positioning in Wireless Local Area Networks", IEEE Transactions On Mobile Computing, IEEE Service Center, Los Alamitos, CA, US, vol. 6, No. 6, Jun. 1, 2007, pp. 689-705, XP011179712, ISSN: 1536-1233, DOI: 10.1109/TMC.2007.1017.

* cited by examiner

| RSSI = -50 | | | |
|---|---|---|---|
| MCS | RATE | PER | GP |
| | | | |

| RSSI = -60 | | | |
|---|---|---|---|
| MCS | RATE | PER | GP |
| | | | |

| RSSI = -70 | | | |
|---|---|---|---|
| MCS | RATE | PER | GP |
| 0 | - | - | - |
| 1 | 100M | 10% | 90 |
| 2 | 200M | 15% | 170 |
| 3 | 300M | 20% | 240 |
| 4 | 400M | 25% | 300 |
| 5 | 600M | 30% | 420 |
| 6 | 800M | 50% | 400 |

FIG. 3

SELECTING A MODULATION AND CODING SCHEME FOR BEAMFORMED COMMUNICATION

BACKGROUND

1. Field

This application relates generally to wireless communication and more specifically, but not exclusively, to selecting a modulation and coding scheme for beamformed communication.

2. Introduction

Some wireless communication apparatuses (e.g., devices) employ directional antenna systems to improve antenna gain. To provide this directionality, the signals that drive the different antennas of the antenna system are weighted differently (e.g., in terms of signal phase and, optionally, amplitude).

IEEE 802.11ad is directed to wireless communication in the 60 GHz frequency range. Due to the high propagation losses at these frequencies, directional antenna systems are supported by this standard to improve antenna gain and thereby improve communication performance. Specifically, the antennas for each 802.1 lad apparatus may be configured to support a quasi-omni-directional beam pattern, a sector level beam pattern, or a refined beam pattern (i.e., a narrower beam than a sector level beam). To provide these different beam patterns, an appropriate antenna weight taken from a set of antenna weights (e.g., a set comprising: $\{1, -1, j, -j\}$) is assigned to each antenna. For the case of the set $\{1, -1, j, -j\}$, for a given antenna, the amplitude is always "1" and the phase is one of 0°, 90°, 180°, and 270°.

For a given beam pattern, an apparatus may support several modulation and coding schemes (MCSs) each of which specifies a particular transmission rate. A conventional rate selection algorithm will periodically conduct goodput calculations to determine whether the apparatus should move up to the next highest defined rate or move down to the next lowest defined rate. However, these algorithms are based on an assumption that changes in MCS (e.g., based on the measured signal quality) will occur relatively slowly.

SUMMARY

A summary of several sample aspects of the disclosure follows. This summary is provided for the convenience of the reader and does not wholly define the breadth of the disclosure. For convenience, the term some aspects is used herein to refer to a single aspect or multiple aspects of the disclosure.

The disclosure relates in some aspects to tracking signal quality in beamformed communications. In an apparatus that employs a directional antenna system for beamformed communication, the beamformed link is monitored over time to ensure that the best beam pattern is being used for the link (e.g., to account for changes in operating conditions). For example, if one or more of the apparatuses is moved, the beam used by a given apparatus may no longer be directed toward the other apparatus. In addition, if an external object ends up within a beam (e.g., due to movement of the object, movement of an apparatus, or both), the object may block the beam.

In some cases, a change in the beam pattern used by an apparatus causes an abrupt change in the signal quality (e.g., received signal strength indication (RSSI), signal-to-noise ratio, etc.) of the apparatus's communication. This abrupt change in signal quality may, in turn, adversely affect the ability of a rate selection algorithm employed by the apparatus to quickly determine the optimum MCS.

The disclosure relates in some aspects to adaptive rate selection for directional antenna systems. At least one table is defined that maps different ranges of signal quality values to different sets of MCS-related parameters for a given apparatus. For example, for a given range of signal quality values (e.g., a range of RSSI values), a set of MCS types is mapped to a set of goodput values that have been calculated for those MCS types. In some implementations, each range corresponds to a separate table (e.g., a given table will include the MCS and other information for that range of signal quality values). In some implementations, all of the ranges are included in a single table.

In the event an abrupt change in signal quality is detected (e.g., a change in RSSI greater than or equal to a defined threshold), instead of using a conventional rate selection algorithm, a new MCS is selected based on the ranges from the table(s). For example, the range corresponding to the current signal quality (e.g., the table corresponding to that signal quality) is identified, and the MCS information defined for that range (table) is then used to select the new MCS. Hence, a relatively large change in MCS may be accommodated, if warranted by the change in signal quality.

In view of the above, in some aspects, wireless communication in accordance with the teachings herein involves: receiving signal quality feedback from an apparatus; determining a first signal quality associated with first beamformed communication based on the signal quality feedback; determining a second signal quality associated with second beamformed communication based on the signal quality feedback; calculating a difference between the first signal quality and the second signal quality; determining whether the difference is greater than or equal to a threshold; and selecting a modulation and coding scheme for subsequent beamformed communication as a result of a determination that the difference is greater than or equal to the threshold, wherein the selection uses the determined second signal quality to select the modulation and coding scheme from at least one rate table.

BRIEF DESCRIPTION OF THE DRAWINGS

These and other sample aspects of the disclosure will be described in the detailed description and the claims that follow, and in the accompanying drawings, wherein:

FIG. 3 is a simplified diagram illustrating several examples of signal quality-based MCS tables;

Figure 1:
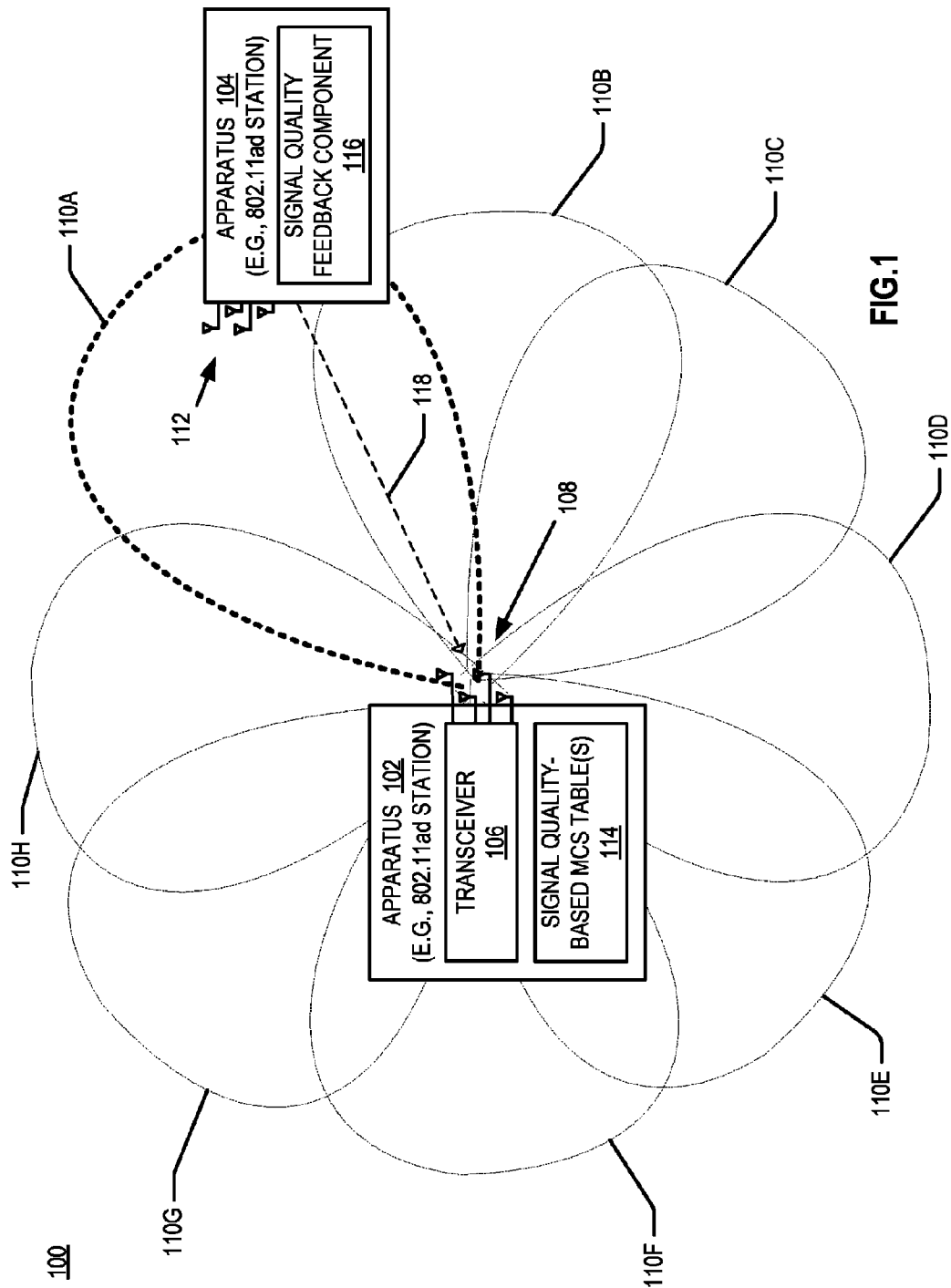
FIG. 1 is a simplified block diagram of several sample aspects of a communication system comprising apparatuses that employ beamformed communication.

In accordance with common practice, the features illustrated in the drawings are simplified for clarity and are generally not drawn to scale. That is, the dimensions and spacing of these features are expanded or reduced for clarity in most cases. In addition, for purposes of illustration, the drawings generally do not depict all of the components that are typically employed in a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim. As an example of the above, in some aspects, an apparatus comprises: a transceiver configured to receive signal quality feedback from another apparatus; and a processing system configured to: determine a first signal quality associated with first beamformed communication based on the signal quality feedback; determine a second signal quality associated with second beamformed communication based on the signal quality feedback; calculate a difference between the first signal quality and the second signal quality; determine whether the difference is greater than or equal to a threshold; and select a modulation and coding scheme for subsequent beamformed communication as a result of a determination that the difference is greater than or equal to the threshold, wherein the selection uses the determined second signal quality to select the modulation and coding scheme from at least one rate table. In addition, in some aspects, the first signal quality comprises a first received signal strength indication; and the second signal quality comprises a second received signal strength indication.

FIG. 1 illustrates sample aspects of a communication system 100 where an apparatus 102 communicates with an apparatus 104 and, optionally, other apparatuses (not shown). The apparatus 102 includes a transceiver 106 that cooperates with an antenna system 108 (e.g., an antenna array) to generate directional beam patterns to provide higher gain for high frequency signaling (e.g., 60 GHz band). Examples of directional beam patterns 110A-110H that the apparatus 102 may generate are represented in a simplified form in FIG. 1 by the corresponding dashed line symbols. In practice, the apparatus 102 will generally use different beam patterns for signal transmission versus signal reception. Only one set of beam patterns is shown, however, to reduce the complexity of FIG. 1.

The apparatus 104 may include a similar transceiver (not shown) and antenna system 112 to generate directional beam patterns. To reduce the complexity of FIG. 1, the beam patterns for the apparatus 104 are not shown. In some implementations, the apparatuses comprise IEEE 802.11ad stations. It should be appreciated, however, that the teachings herein may be applied to other types of communication technologies.

In general, to close the link budget for communication between the apparatuses 102 and 104 and to achieve the best possible signal quality for this communication, the apparatuses 102 and 104 each select the beam pattern (for either a transmit or receive operation) that provides the best directionality with respect to the other apparatus. In the simplified example of FIG. 1, the apparatus 102 selects the beam pattern 110A to communicate with the apparatus 104.

In accordance with the teachings herein, the apparatus 102 maintains at least one signal quality-based MCS table 114 that is used for selecting the MCS for communication with another apparatus (e.g., the apparatus 104). As discussed in more detail below, the table(s) 114 include(s) sets of MCS parameters that are associated with defined signal quality ranges. A specific set of MCS parameters to be considered for use at a given point in time is based, in some aspects, on the signal quality associated with a recent transmission. To this end, the apparatus 104 includes a signal quality feedback component 116 that sends an indication (as represented by a dashed line 118) of the received signal quality of a beamformed signal (e.g., comprising data) received by the apparatus 104 from the apparatus 102.

To enable the apparatuses 102 and 104 to perform similar operations, the apparatus 104 may maintain at least one signal quality-based MCS table and the apparatus 102 may include a signal quality feedback component. To reduce the complexity of FIG. 1, however, these components are not shown.

In the example of FIG. 1, the apparatuses 102 and 104 each employ four antennas and eight different beam patterns are shown for the apparatus 102. It should be appreciated that the teachings herein are applicable to other implementations that include a different number of antennas, a different number of apparatuses, and a different number of beam patterns.

The antenna systems 108 and 112 may employ various types of antenna designs to achieve a directional beam pattern. An antenna array is but one example of such a design. An antenna array is a group of simple antenna elements such that signals running through them are of different amplitudes and phases. These amplitudes and phases are called antenna weights, and the set of the antenna weights is called the antenna weight vector (AWV).

In a simplified model, each antenna element in an antenna array is an isotropic radiator. This implies that each antenna element by itself is an antenna of isotropic pattern, also known as omni-directional pattern. A further simplification assumes that antenna weights all have the same amplitude and a limited number of phases. For example, all antenna weights may take values from the set of $\{1, -1, j, -j\}$. Such a restriction enables an antenna array configuration to be accomplished using 2 bits per antenna element.

Each antenna pattern corresponds to a beam, which is in turn realized by an AWV. Antenna pattern selection is usually a tradeoff between antenna gain and beam width. The higher the gain, the narrower the antenna array has to concentrate its energy radiation, thus the narrower the beam. Several examples of antenna patterns are described below.

Under some conditions (e.g., when initially attempting to discover nearby apparatuses), an apparatus uses an omni-directional pattern. Ideally, an isotropic radiator would generate a true omni-directional pattern. In practice, however, a perfect omni-directional pattern is not achievable. Thus, this pattern is referred to as a quasi-omni-directional pattern.

Under some conditions (e.g., when using beamforming to communicate with a specific apparatus), an apparatus uses sector level beam patterns. The beam patterns 110A-110H illustrate a simplified example of eight sector beam patterns. The nominal width of a sector level beam is narrower than the quasi-omni-directional pattern but wider than a refined beam (discussed below). An apparatus may perform a sector level sweep based on a defined set of sector level beams to establish communication with another apparatus, improve communication with another apparatus, or both.

Under some conditions (e.g., to establish high quality communication with a specific apparatus), an apparatus uses refined beam patterns. The nominal width of a refined beam is narrower than the nominal width of the sector level beam. In some aspects, an apparatus may provide more refined beam selection by using a narrower refined beam to achieve higher gain.

A beamforming protocol may be employed to enable an apparatus to select proper beams for data exchanges with another apparatus. IEEE 802.1 lad defines a sector level sweep (SLS) protocol and a beam refinement protocol (BRP) for beam selection. A sector level beam may be selected using either the SLS protocol or the BRP protocol. A refined beam may be selected using the BRP protocol. The quasi-omni pattern is unique across all peer apparatuses. Consequently, a protocol need not be used to select this pattern for a given apparatus. Also, beam selection for sector level and refined beam hierarchies may be deemed as "not available" if the corresponding beamforming protocol has not succeeded.

In accordance with the teachings herein, an apparatus may track a beamformed link with respect to a peer apparatus to mitigate degradation associated with the selected beam that may occur over time. Such beam degradation may, for example, be due to a change in the relative orientation of the apparatuses, due to blocking, or both.

A change in apparatus orientation may cause a selected beam to point in a different direction (e.g., away from the peer apparatus). In practice, this condition may affect refined beams more than sector level beams, since refined beams usually have narrower beam width. Degradation caused by a change in apparatus orientation may be moderate in some cases. Here, the refined beam may still be usable, but with a reduced data rate. In other cases, however, degradation may be severe. In these cases, the refined beam may be unusable. However, the sector level beam may still be usable.

Blocking may occur when an object is present in the beam path between two apparatuses. Typically, blocking is manifested by a sudden change in the selected beam. In some cases, the original beam may be completely lost. Consequently, another beam that points in another direction may need to be selected to maintain communication between the apparatuses (even though the alternate beam may provide worse signal quality than the original beam).

The disclosure relates in some aspects to a scheme that facilitates selecting optimum MCS for beamformed communication even in the face of abrupt changes in the quality of a beamformed link (e.g., caused by movement of an apparatus or beam blockage). For purposes of illustration, various aspects of the disclosure will be described in the context of an apparatus that maintains a set of MCS tables, each of which is associated with a range of RSSI values (received signal strength indications). It should be appreciated, however, that the teachings herein are applicable to other forms of signal quality other than RSSI and that a single table (defining sets of ranges) could be used instead of a set of tables.

Figure 2:
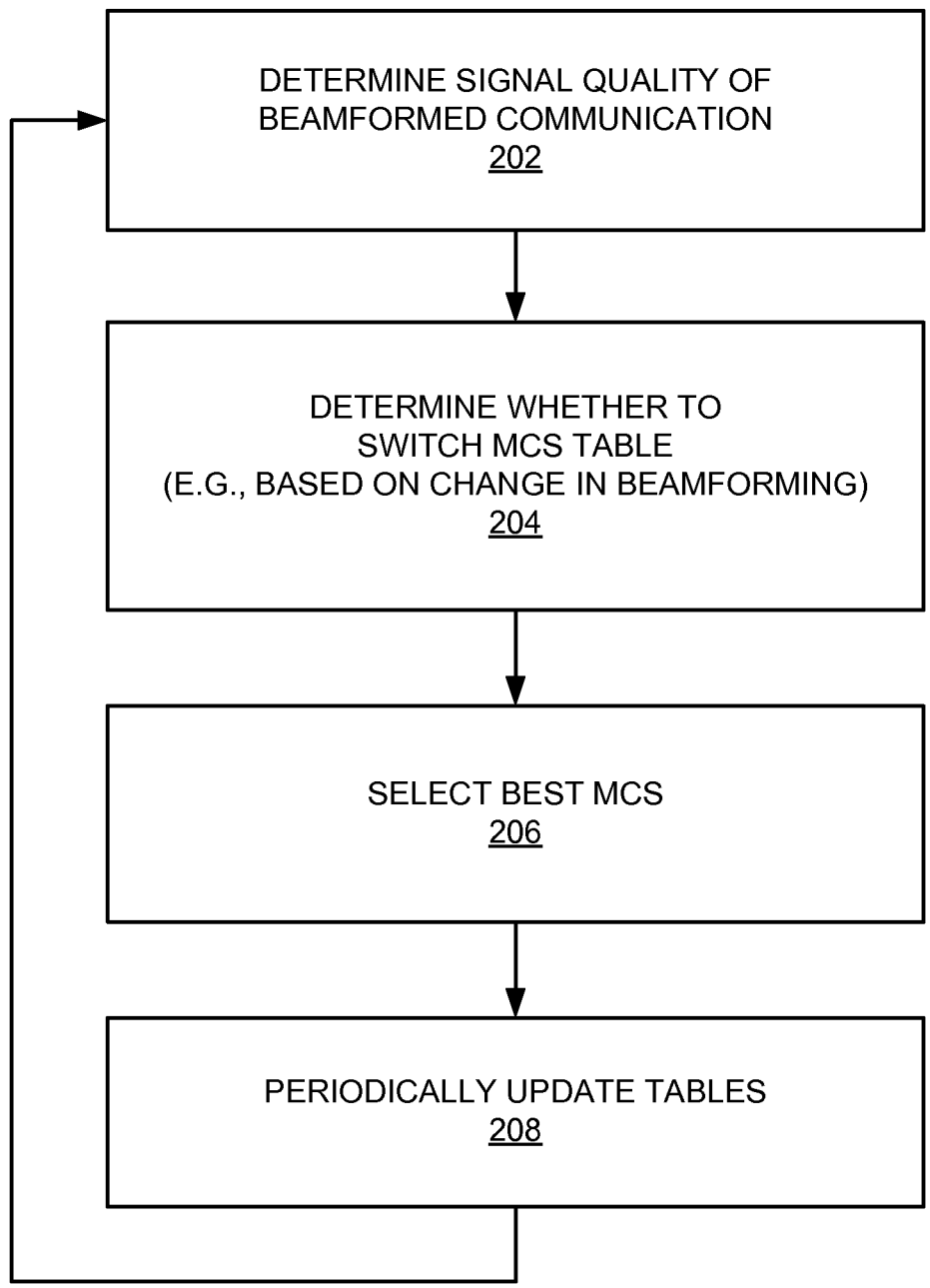
FIG. 2 is a flowchart of several sample aspects of operations performed in conjunction with updating and switching MCS tables.

FIG. 2 illustrates an example of high-level operations relating to updating and switching MCS tables. For purposes of illustration, the operations of FIG. 2 (or any other operations discussed or taught herein) may be described as being performed by specific components. These operations may be performed by other types of components and may be performed using a different number of components in other implementations. Also, it should be appreciated that one or more of the operations described herein may not be employed in a given implementation. For example, one entity may perform a subset of the operations and pass the result of those operations to another entity.

As represented by block 202 of FIG. 2, at various points in time, an apparatus determines the signal quality associated with its beamformed communication. For example, the apparatus may receive signal quality feedback information from another apparatus that receives the beamformed communication.

Signal quality information may take a variety of forms. For example, a receiving apparatus may include an RSSI value (indicative of the RSSI of the last frame transmission) in an ACK frame that acknowledges that transmission. Thus, signal quality feedback may be received on a frame-by-frame basis. In some implementations, the receiving apparatus calculates signal-to-noise ratio (SNR) values based on received data and sends this SNR information back to the transmitting apparatus.

As represented by block 204, the apparatus determines whether to switch to a different MCS table based on the signal quality determination of block 202. As discussed in more detail below, an MCS table switch may be invoked as a result of a significant change (e.g., rise) in monitored signal quality. For example, an abrupt change in RSSI due to improvement of the current beam (e.g., from a sector level beam to a refined beam) may trigger a switch from the use of a current MCS table to another MCS table for future beamformed communication. In this way, the apparatus may quickly move up to a higher rate (e.g., by jumping several rates). In contrast, a conventional MCS selection scheme may not be able to change the rate as quickly. Consequently, a conventional apparatus may stay at an undesirable rate for some time.

As represented by block 206, the apparatus selects the best MCS for the current operating conditions from the current MCS table. Depending on the determination of block 204, this selection may be from the prior MCS table (no switch at block 204) or from a different MCS table (switch at block 204).

In some aspects, the selection of the MCS value from a table involves determining the highest rate that can be achieved and that provides the best goodput. For example, an apparatus may periodically probe higher rates (e.g., temporarily operate at higher rates) from the table to determine whether a higher goodput can be achieved at the higher rate. If so, the apparatus will switch to the higher rate. Conversely, the apparatus may need to select a lower rate if a higher goodput is achieved at the lower rate.

In general, goodput is a quality measure that takes into account the rate achieved and the quality of the communication (e.g., the errors at that rate). For example, goodput may be calculated according to the formula: goodput (GP)=rate (1-PER), where PER is packet error rate.

As represented by block 208, the MCS tables are updated over time (e.g., periodically) to ensure that the information in the tables remains current. For example, the apparatus may regularly conduct tests to determine the signal quality that may be achieved using different MCS parameters.

FIG. 3 illustrates an example of a set of MCS tables. Tables corresponding to the tables of FIG. 3 are maintained in (or for) each apparatus that employs the techniques taught herein. It should be appreciated that such a table may take other forms in accordance with the teachings herein. For example, a given table may include other parameters, additional parameters, or both. Also, tables may be associated with different signal quality ranges than those shown. In addition, a different number of tables may be included in a set.

In the example of FIG. 3, three tables are shown, each of which is associated with a range of RSSI values. For example, each table may be associated with a 10 db range centered around the indicated RSSI value (−70, −60, and −50).

Each table includes sets of MCS parameters that correspond to the RSSI range. For example, based on periodic tests, an apparatus may determine that the indicated MCSs (corresponding to the specified PHY rate) provide the stated packet error rate (PER) and goodput (GP). To reduce the complexity of FIG. 3, MCS values are depicted only for the first table (RSSI=−70).

Figure 4:
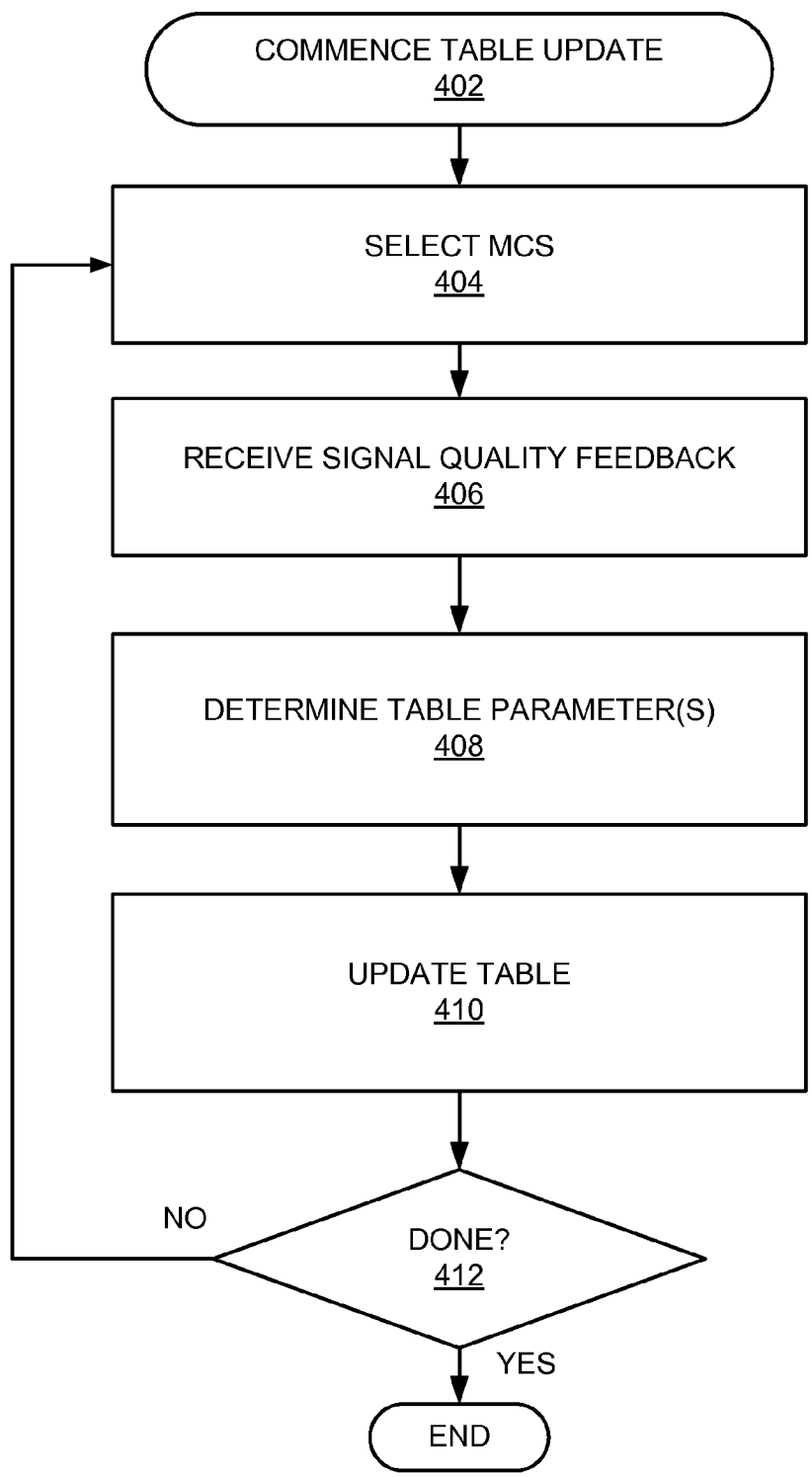
FIG. 4 is a flowchart of several sample aspects of operations performed in conjunction with updating MCS tables.

FIG. 4 illustrates several sample operations related to updating MCS tables. In some aspects, the RSSI achieved over a beamformed link is related to rate selection (e.g., MCS). However, various receiver specific factors (e.g., a receiver's noise figure, impairment, and implementation specifics) may affect this relationship. Hence, the RSSI-MCS mapping may be determined on an individual basis by each transmitting apparatus (e.g., station).

The operations of FIG. 4 commence at block 402 (e.g., according to a periodic schedule).

As represented by block 404, the apparatus selects an MCS to test. For example, the apparatus may configure its transmitter to operate at the corresponding rate and transmit a test frame at that rate to a peer apparatus.

As represented by block 406, the apparatus receives signal quality feedback. For example, the peer apparatus may send an acknowledgement frame that indicates the RSSI seen at the peer apparatus and the PER calculated at the peer apparatus.

As represented by block 408, the apparatus determines the appropriate table parameter (or parameters) for the table. Here, the particular table being updated will depend on the corresponding RSSI. In addition, the apparatus may make any necessary calculations to provide the designated MCS parameters. For example, the apparatus may compute a moving average of PER per RSSI value, and then calculate the goodput for each rate. The apparatus updates the table based on the determined values as represented by block 410.

As represented by block 412, the operations of blocks 404-410 are repeated for each of the MCS values of interest. In this way, the set of MCS tables is kept up-to-date (e.g., via periodic updating) such that any switch in MCS table or any selection of an MCS from one of these tables will most likely provide the best MCS under the current operating conditions.

Figure 5:
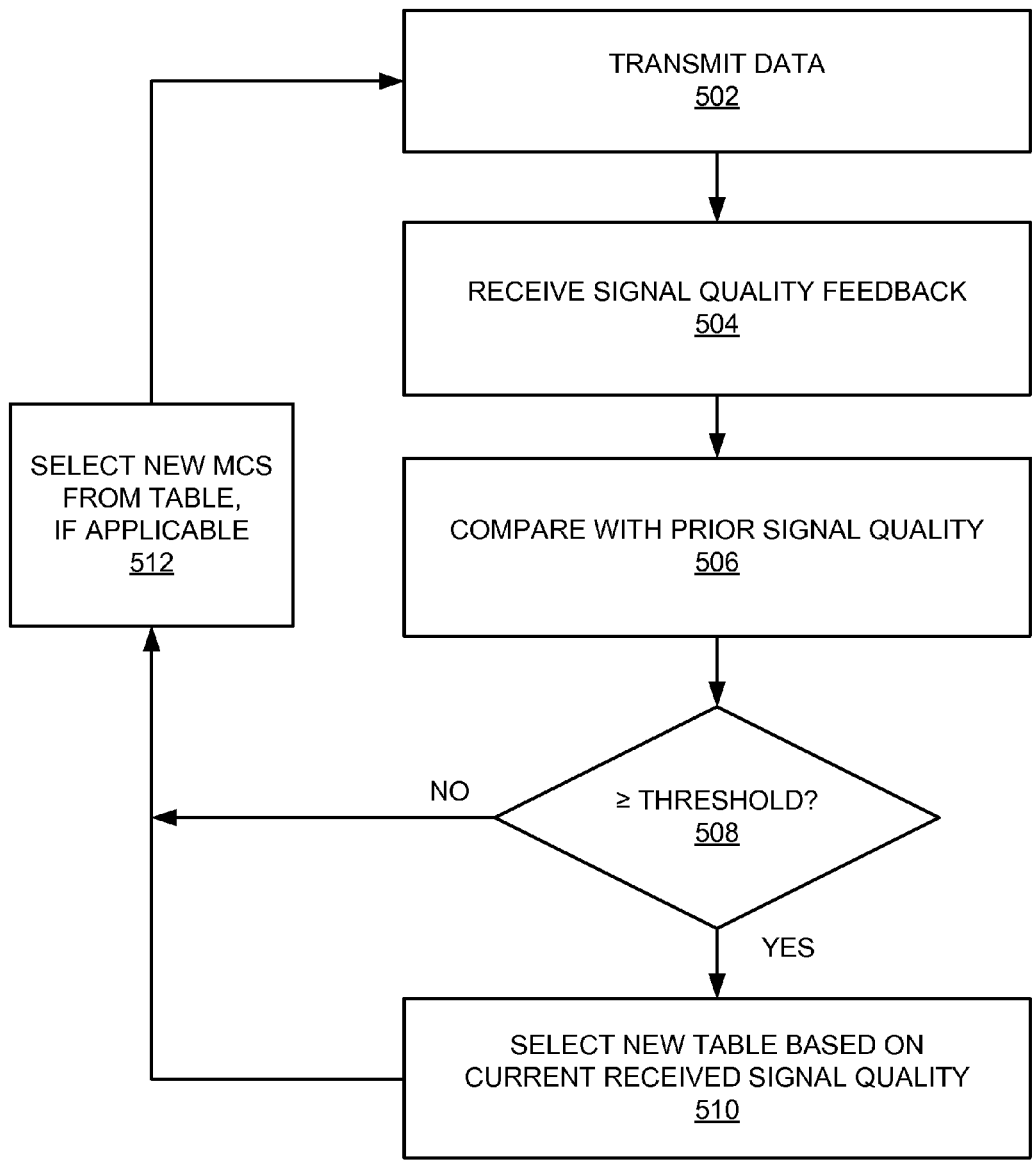
FIG. 5 is a flowchart of several sample aspects of operations performed in conjunction with switching MCS tables and selecting MCS.

FIG. 5 describes several sample operations relating to selection of an MCS table and selection of an MCS value.

As represented by block 502, at some point in time, an apparatus transmits data to another apparatus (e.g., a peer apparatus). For example, the apparatus may transmit a beamformed frame using the best available MCS from the current MCS table.

As represented by block 504, the apparatus receives signal quality feedback associated with the beamformed transmission. For example, as a result of transmitting a frame at block 502, the apparatus may obtain a received signal strength indication from a peer apparatus as discussed herein.

As represented by block 506, the apparatus compares signal quality information obtained at block 504 (i.e., the current signal quality) with prior signal quality information. For example, every time the apparatus receives signal quality feedback, the apparatus may store that information so that it can be compared with subsequent signal quality feedback.

As represented by block 508, a determination is made as to whether the change in signal quality, if any, is greater than or equal to a threshold. In other words, the apparatus checks to see whether there has been an abrupt and relatively significant change in signal quality.

If so, as represented by block 510, the apparatus selects a new table based on the current signal quality (i.e., the signal quality feedback received at block 504). In particular, the apparatus selects the table corresponding to the range within which the current signal quality falls. For example, assuming the tables are configured as discussed above in FIG. 3, a current RSSI value of −59 dB would result in the selection of the second table (designated RSSI=−60). The operational flow then proceeds to block 412 where the apparatus selects a new MCS from the new table. For example, the apparatus may select the MCS that provide the best goodput, or the apparatus may start at the most conservative MCS (e.g., the lowest rate) and proceed to probe any higher rates listed in the table, or vice versa.

Conversely, if there has not been a significant (or any) change in the received signal quality at block 508, a new table is not selected. Hence, the operational flow proceeds to block 412 where the apparatus may either continue to use the MCS used previously or probe for any higher rates listed in the current table.

Figure 6:
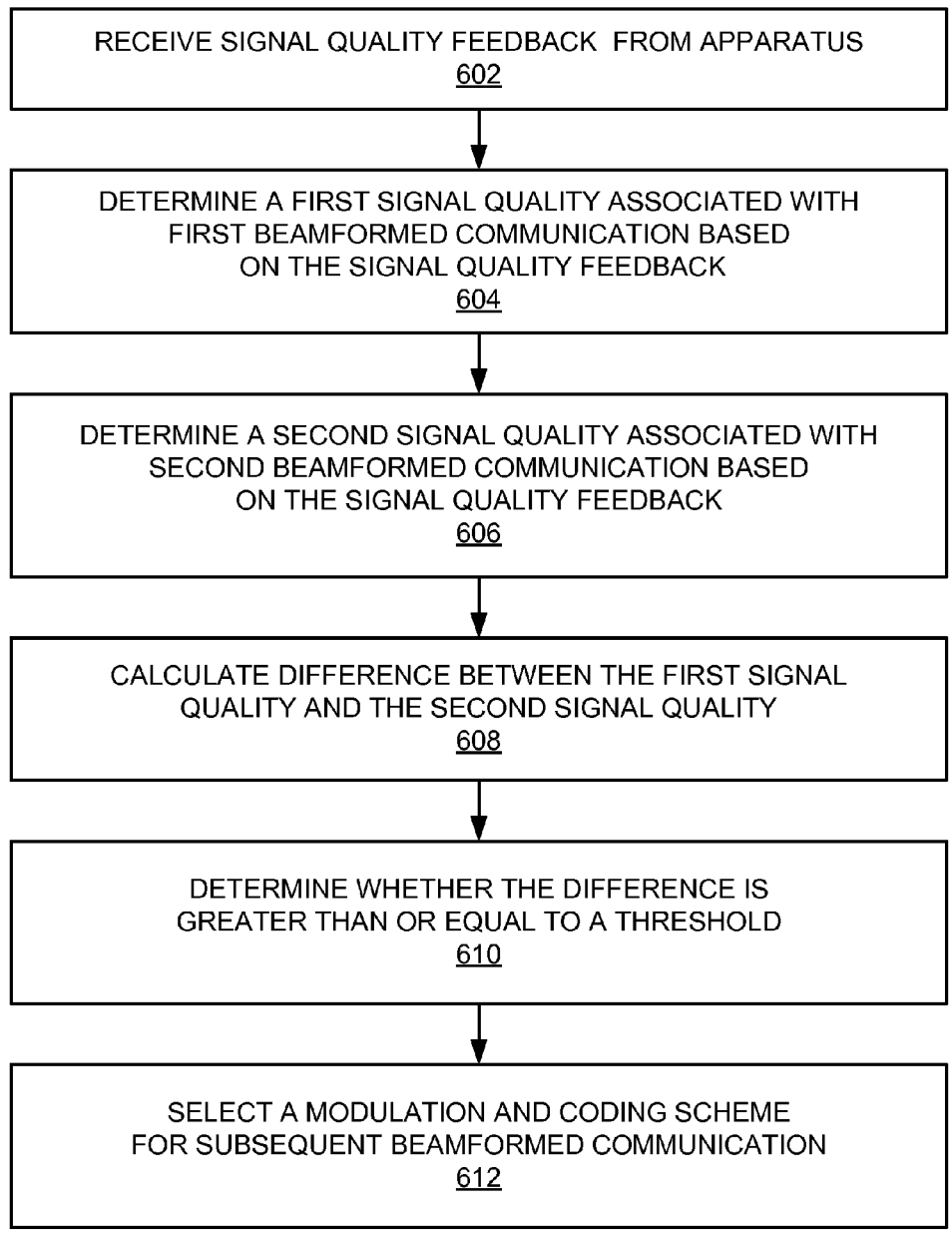
FIG. 6 is a flowchart of several sample aspects of operations performed in conjunction with selecting MCS.

With the above in mind, additional details relating to selecting an MCS in accordance with the teachings herein will be described with reference to FIG. 6. These operations may be performed, for example, by a station that utilizes IEEE 802.11ad-compliant communication.

As represented by block 602, signal quality feedback is received from an apparatus (e.g., another IEEE 802.11ad station). For example, upon receipt of data frames from a first station, a second station may determine (e.g., measure) a signal quality indication associated with each data frame and include those indications in ACK frames that the second station transmits to the first station. In some implementations, an IEEE 802.11ad station provides RSSI feedback in every SIFS response frame (e.g., ACK frame) via a PLCP header. Thus, in some aspects, receiving signal quality feedback at a first apparatus may comprise receiving received signal strength indications from a second apparatus that received beamformed signals transmitted by the first apparatus, where the received signal strength indications were measured by the second apparatus.

As represented by block 604, a first signal quality associated with first beamformed communication is determined based on the signal quality feedback received at block 602. In some implementations, the first signal quality comprises a first received signal strength indication.

As represented by block 606, a second signal quality associated with second beamformed communication is determined based on the signal quality feedback received at block 602. In some implementations, the second signal quality comprises a second received signal strength indication.

The second signal quality relates to a transmission that occurred after the transmission associated with the first signal quality. Typically, the second signal quality relates to the most recent transmission.

In some implementations, the determination of the second signal quality is triggered as a result of a determination that a different beam pattern has been selected for beamformed communication. For example, an apparatus may elect to only check for an abrupt change in signal quality if the apparatus has recently selected a different beam pattern (e.g., a switch from one refined beam to another, a switch from a sector level beam to a refined beam, a switch from a refined beam to a sector level beam, and so on). In some aspects, the determination that a different beam pattern has been selected is based on a determination, by a beam pattern search algorithm, that the different beam pattern is associated with higher signal quality than a beam pattern used for prior (e.g., the first) beamformed communication.

As represented by block 608, the difference between the first signal quality and the second signal quality is calculated. For example, a determination may be made as to the magnitude of any rise in RSSI from the first signal quality to the second signal quality.

As represented by block 610, a determination is made as to whether the difference calculated at block 608 is greater than or equal to a threshold. This may involve, for example, determining whether there has been a significant increase in RSSI. In some aspects, the threshold may be defined to correlate to a degree of change that is not handled well by conventional MCS selection algorithms (e.g., corresponding to circumstances where conventional schemes do not achieve a new appropriate rate relatively quickly).

As represented by block 612, a modulation and coding scheme for subsequent beamformed communication is selected if the result of a determination at block 610 indicates that the difference is greater than or equal to the threshold. Here, the selection uses the determined second signal quality (from block 606) to select the modulation and coding scheme from at least one rate table.

In some aspects, the selection of the modulation and coding scheme comprises: identifying a range of signal quality values that include the second signal quality, wherein the identified range is specified by the at least one rate table; and selecting the modulation and coding scheme from a set of modulation and coding schemes associated with the identified range of signal quality values.

In some aspects, the selection of the modulation and coding scheme comprises: selecting one of the modulation and coding schemes of the set that is associated with a highest goodput value.

In some aspects, the at least one rate table comprises a plurality of rate tables. Accordingly, the selection of the modulation and coding scheme may comprise: identifying a rate table associated with a range of signal quality values that include the second signal quality, wherein the identified rate table is one of the plurality of rate tables; and selecting the modulation and coding scheme from the identified rate table. In addition, the selection of the modulation and coding scheme may comprise selecting a modulation and coding schemes from the identified rate table that is associated with a highest goodput value.

Figure 7:
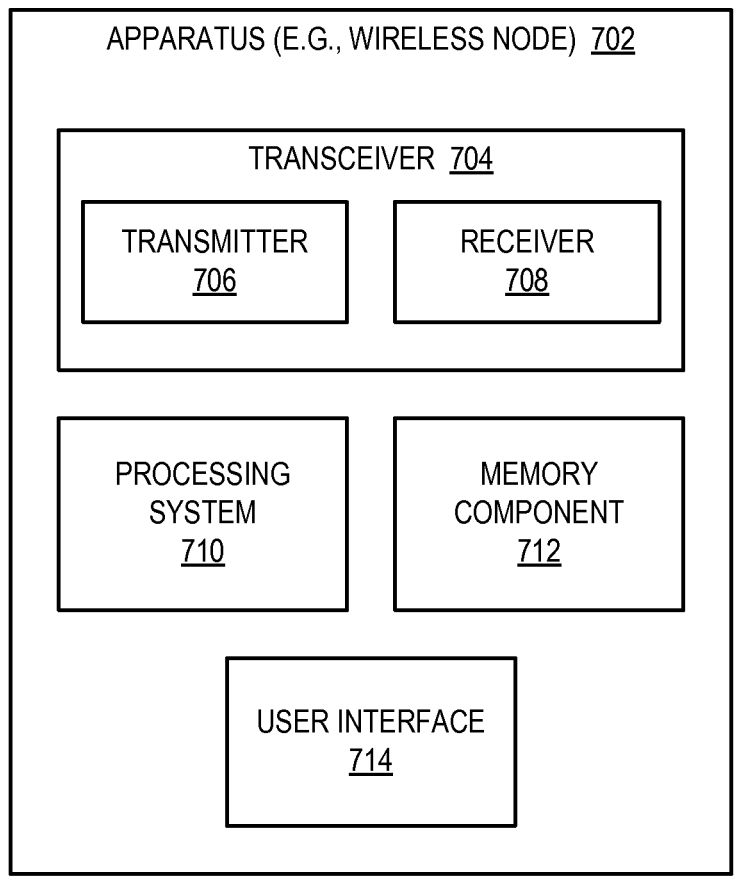
FIG. 7 is a simplified block diagram of several sample aspects of components that may be employed in communication nodes.

FIG. 7 illustrates several sample components (represented by corresponding blocks) that may be incorporated into an apparatus 702 (e.g., corresponding to the apparatuses 102 and 104 of FIG. 1) to perform beamforming-related operations as taught herein. In a typical implementation, the apparatus 702 comprises a wireless node (e.g., a peer-to-peer station, an access point, and access terminal, etc.). It should be appreciated that these components may be implemented in different types of apparatuses in different implementations (e.g., in an ASIC, in a system on a chip (SoC), etc.). The described components also may be incorporated into other nodes in a communication system. For example, other nodes in a system may include components similar to those described for the apparatus 702 to provide similar functionality. Also, a given node may contain one or more of the described components. For example, an apparatus may include multiple transceiver components that enable the apparatus to operate on multiple carriers, communicate via different technologies, or both.

As shown in FIG. 7, the apparatus 702 includes one or more transceivers (as represented by a transceiver 704) for communicating with other nodes. Each transceiver 704 includes a transmitter 706 for sending signals (e.g., transmitting signals comprising frames, packets, etc.) and a receiver 708 for receiving signals (e.g., frames, packets, signal quality feedback, etc.). In some aspects, the transceiver transmits such signals via an antenna system, receives such signals via an antenna system, or both.

The apparatus 702 also includes other components that are used in conjunction with beamforming-related operations as taught herein. The apparatus 702 includes a processing system 710 for processing received signals, processing signals to be transmitted, or both, and for providing other related functionality as taught herein. For example, in some implementations the processing system performs one or more of: determining a first signal quality associated with first beamformed communication based on the signal quality feedback; determining a second signal quality associated with second beamformed communication based on the signal quality feedback; calculating a difference between the first signal quality and the second signal quality; determining whether the difference is greater than or equal to a threshold; selecting a modulation and coding scheme for subsequent beamformed communication as a result of a determination that the difference is greater than or equal to the threshold, wherein the selection uses the determined second signal quality to select the modulation and coding scheme from at least one rate table; or determining that a different beam pattern has been selected for beamformed communication. In some implementations, operations described herein as being performed by the processing system 710 may instead be performed, at least in part, by the transceiver 704, and vice versa. The apparatus 702 includes a memory component 712 (e.g., including a memory device) for maintaining information (e.g., an MCS table). The apparatus 702 also includes a user interface 714 for providing indications (e.g., audible indication, visual indications, or both) to a user, for receiving user input (e.g., upon user actuation of a sensing device such a microphone, a camera, a keypad, and so on), or both.

The components of FIG. 7 may be implemented in various ways. In some implementations the components of FIG. 7 are implemented in one or more circuits such as, for example, one or more processing systems, one or more ASICs (which may include one or more processing systems), or both. Here, each circuit (e.g., processing system) may use memory, incorporate memory, or both, for storing information or executable code used by the circuit to provide this functionality. For example, some of the functionality represented by block 704 and some or all of the functionality represented by blocks 710-714 may be implemented by a processing system of an apparatus and memory of the apparatus (e.g., by execution of appropriate code, by appropriate configuration of processing system components, or both).

Figure 8:
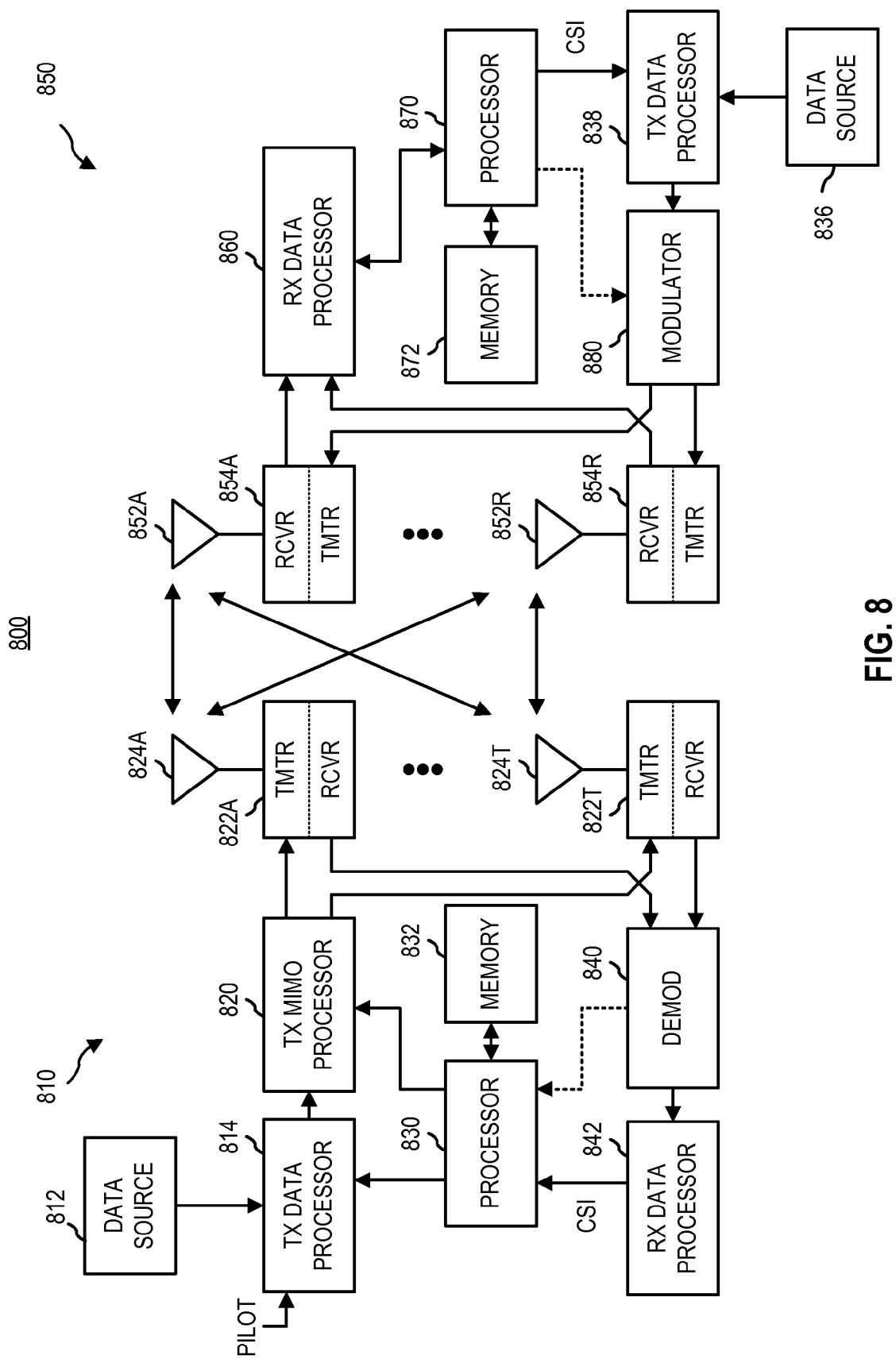
FIG. 8 is a simplified block diagram of several sample aspects of communication components.

FIG. 8 illustrates in more detail sample components that may be employed in a pair of wireless nodes of a MIMO system 800. In this example, the wireless nodes are labeled as a wireless device 810 (e.g., an access point) and a wireless device 850 (e.g., an access terminal). It should be appreciated that a MU-MIMO system will include other devices (e.g., access terminals) similar to the wireless device 850. To reduce the complexity of FIG. 8, however, only one such device is shown.

The MIMO system 800 employs multiple ($N_T$) transmit antennas and multiple ($N_R$) receive antennas for data transmission. A MIMO channel formed by the $N_T$ transmit and $N_R$ receive antennas is decomposed into $N_S$ independent channels, which are also referred to as spatial channels, where $N_S \leq \min\{N_T, N_R\}$.

The MIMO system 800 supports time division duplex (TDD), frequency division duplex (FDD), or both. In a TDD system, the forward and reverse link transmissions are on the same frequency region so that the reciprocity principle allows the estimation of the forward link channel from the reverse link channel. This enables the access point to extract transmit beamforming gain on the forward link when multiple antennas are available at the access point.

Referring initially to the device 810, traffic data for a number of data streams is provided from a data source 812 to a transmit (TX) data processor 814. Each data stream is then transmitted over a respective transmit antenna.

The TX data processor 814 formats, codes, and interleaves the traffic data for each data stream based on a particular coding scheme selected for that data stream to provide coded data. The coded data for each data stream is multiplexed with pilot data using OFDM techniques or other suitable techniques. The pilot data is typically a known data pattern that is processed in a known manner and used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream are typically determined by instructions performed by a processor 830. A memory 832 stores program code, data, and other information used by the processor 830 or other components of the device 810.

The modulation symbols for all data streams are then provided to a TX MIMO processor 820, which further processes the modulation symbols (e.g., for OFDM). The TX MIMO processor 820 then provides $N_T$ modulation symbol streams to $N_T$ transceivers (XCVR) 822A through 822T. In some aspects, the TX MIMO processor 820 applies beam-forming weights to the symbols of the data streams and to the antenna from which the symbol is being transmitted.

Each transceiver 822 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 822A through 822T are then transmitted from $N_T$ antennas 824A through 824T, respectively.

At the device 850, the transmitted modulated signals are received by $N_R$ antennas 852A through 852R and the received signal from each antenna 852 is provided to a respective transceiver (XCVR) 854A through 854R. Each transceiver 854 conditions (e.g., filters, amplifies, and downconverts) a respective received signal, digitizes the conditioned signal to provide samples, and further processes the samples to provide a corresponding "received" symbol stream.

A receive (RX) data processor 860 then receives and processes the $N_R$ received symbol streams from $N_R$ transceivers 854 based on a particular receiver processing technique to provide $N_T$ "detected" symbol streams. The RX data processor 860 then demodulates, deinterleaves, and decodes each detected symbol stream to recover the traffic data for the data stream. The processing by the RX data processor 860 is complementary to that performed by the TX MIMO processor 820 and the TX data processor 814 at the device 810.

A processor 870 periodically determines which precoding matrix to use (discussed below). The processor 870 formulates a reverse link message comprising a matrix index portion and a rank value portion. A memory 872 stores program code, data, and other information used by the processor 870 or other components of the device 850.

The reverse link message comprises various types of information regarding the communication link, the received data stream, or both. The reverse link message is processed by a TX data processor 838, which also receives traffic data for a number of data streams from a data source 836, modulated by a modulator 880, conditioned by the transceivers 854A through 854R, and transmitted back to the device 810.

At the device 810, the modulated signals from the device 850 are received by the antennas 824, conditioned by the transceivers 822, demodulated by a demodulator (DEMOD) 840, and processed by a RX data processor 842 to extract the reverse link message transmitted by the device 850. The processor 830 then determines which precoding matrix to use for determining the beamforming weights by processing the extracted message.

In some implementations, one or more of the processors 830, 814, 820, 838, 842, 860, or 870 perform one or more of the beamforming-related operations described herein. It should be appreciated that these operations may be performed in cooperation with other components of FIG. 8, by other components of FIG. 8, or both, in some implementations.

An apparatus may include various components that perform functions based on signals that are transmitted by or received at the wireless node. For example, in some implementations, an apparatus comprises a user interface configured to output an indication based on a signal that is received through the use of beamforming as taught herein. In some implementations, an apparatus comprises a receiver configured to receive a signal (e.g., message) through the use of beamforming as taught herein.

The teachings herein may be incorporated into (e.g., implemented within or performed by) a variety of apparatuses (e.g., devices). For example, one or more aspects taught herein may be employed for cable replacement (e.g., HDMI cable replacement), wireless docking, media content hosting (e.g., via a video player), media kiosk applications, Mobile Internet applications, media distribution, and so on. Accordingly, one or more aspects taught herein may be incorporated into a computer, a monitor, a phone (e.g., a cellular phone), a tablet device, a portable entertainment device, a home entertainment device, a set-top box, a gaming device, a user I/O device, a point-of-sale device, a kiosk, or any other suitable device. There are other multitudes of applications that may incorporate any aspect of the disclosure as described herein.

The teachings herein may be incorporated into (e.g., implemented within or performed by) a variety of apparatuses. In some aspects, an apparatus implemented in accordance with the teachings herein may comprise a wireless node such as an access point or an access terminal.

A wireless node as taught herein may communicate via one or more wireless communication links that are based on or otherwise support any suitable wireless communication technology. For example, in some aspects a wireless node may associate with a network such as a local area network or a wide area network. To this end, a wireless node may support or otherwise use one or more of a variety of wireless communication technologies, protocols, or standards such as, for example, Wi-Fi, WiMAX, CDMA, TDMA, OFDM, and OFDMA. Also, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

An access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects a wireless node comprises an access device (e.g., an access point) for a communication system. Such an access device provides, for example, connectivity to another network (e.g., a wide area network such as the Internet or a cellular network) via a wired or wireless communication link. Accordingly, the access device enables another device (e.g., a wireless station) to access the other network or some other functionality. In addition, it should be appreciated that one or both of the devices may be portable or, in some cases, relatively non-portable. Also, it should be appreciated that a wireless node also may be capable of transmitting information, receiving information, or both, in a non-wireless manner (e.g., via a wired connection) via an appropriate communication interface.

The teachings herein may be incorporated into various types of communication systems, system components, or both. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology. UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an Ultra-Mobile Broadband (UMB) system, and other types of systems. LTE is a release of UMTS that uses E-UTRA. UTRA, E-UTRA, GSM, UMTS and LTE are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1×RTT, 1×EV-DO Rel0, RevA, RevB) technology and other technologies.

Figure 9:
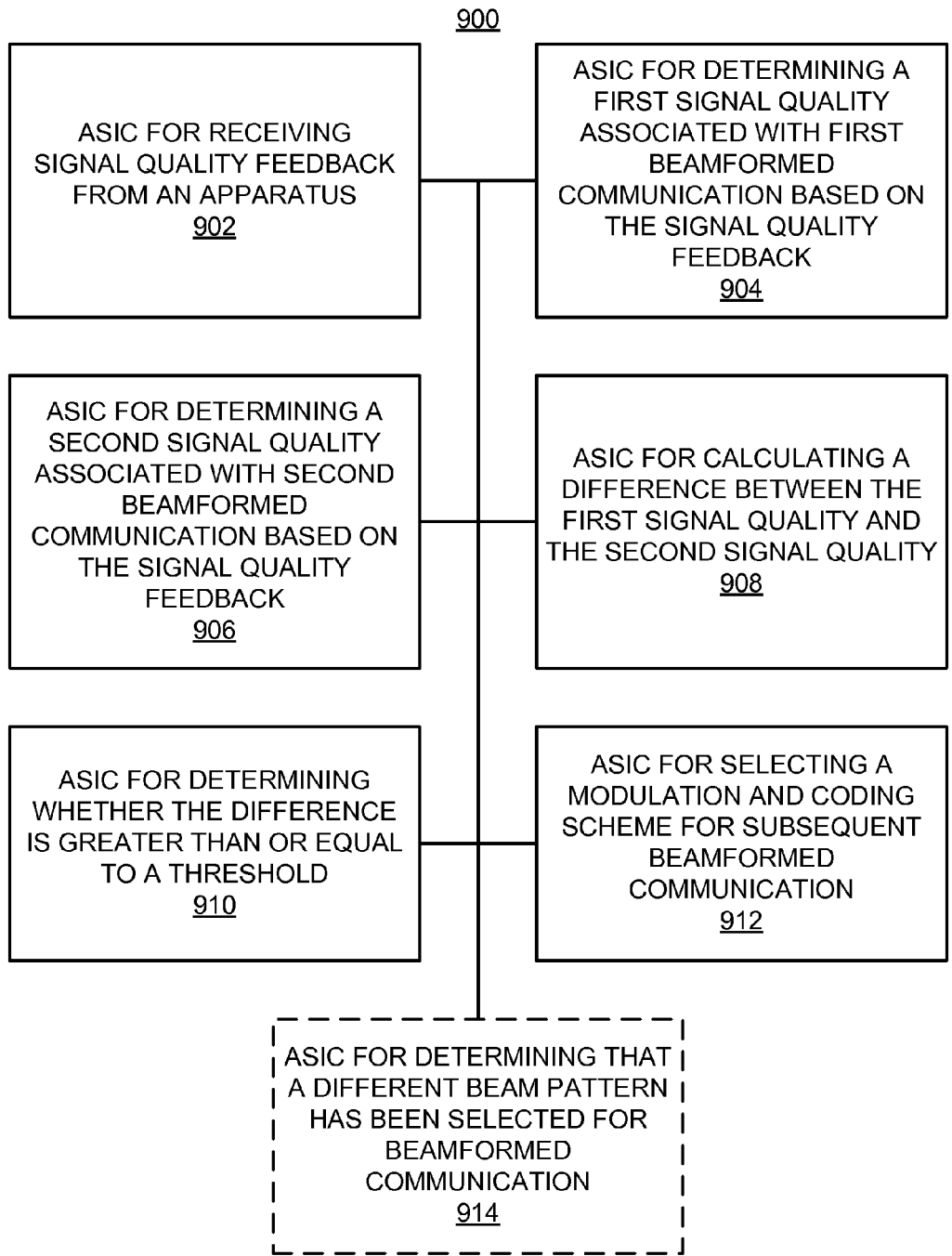
FIG. 9 is a simplified block diagram of several sample aspects of an apparatus configured to select MCS.

The components described herein may be implemented in a variety of ways. Referring to FIG. 9, an apparatus 900 is represented as a series of interrelated functional components that represent functions implemented by, for example, one or more integrated circuits (e.g., an ASIC) or implemented in some other manner as taught herein. As discussed herein, an integrated circuit may include a processor, software, other components, or some combination thereof. In some aspects one or more of any components represented by dashed boxes are optional.

The apparatus 900 includes one or more modules that perform one or more of the functions described above with regard to various figures. An ASIC for receiving signal quality feedback from an apparatus 902 may correspond to, for example, a transceiver as discussed herein. An ASIC for determining a first signal quality associated with first beamformed communication based on the signal quality feedback 904 may correspond to, for example, a processing system as discussed herein. An ASIC for determining a second signal quality associated with second beamformed communication based on the signal quality feedback 906 may correspond to, for example, a processing system as discussed herein. An ASIC for calculating a difference between the first signal quality and the second signal quality 908 may correspond to, for example, a processing system as discussed herein. An ASIC for determining whether the difference is greater than or equal to a threshold 910 may correspond to, for example, a processing system as discussed herein. An ASIC for selecting a modulation and coding scheme for subsequent beamformed communication 912 may correspond to, for example, a processing system as discussed herein. An ASIC for determining that a different beam pattern has been selected for beamformed communication 914 may correspond to, for example, a processing system as discussed herein.

In some aspects, at least one processor may be configured to implement a portion or all of the functionality of one or more of the above components of the apparatus 900. Thus, the functionality of different components may be implemented, for example, as different subsets of an integrated circuit, as different subsets of a set of software modules, or a combination thereof. Also, it should be appreciated that a given subset (e.g., of an integrated circuit, a set of software modules, or both) may provide at least a portion of the functionality for more than one component.

The apparatus 900 may comprise one or more integrated circuits in some implementations. For example, in some aspects a single integrated circuit implements the functionality of one or more of the illustrated components, while in other aspects more than one integrated circuit implements the functionality of one or more of the illustrated components.

The components and functions represented by FIG. 9 as well as other components and functions described herein, may be implemented using any suitable means. Such means are implemented, at least in part, using corresponding structure as taught herein. For example, the components described above in conjunction with the "ASIC for" components of FIG. 9 correspond to similarly designated "means for" functionality. Thus, one or more of such means may be implemented using one or more of processor components, integrated circuits, or other suitable structure as taught herein in some implementations. Several examples follow. In some aspects, means for receiving signal quality feedback from an apparatus comprises a transceiver. In some aspects, means for determining a first signal quality associated with first beamformed communication based on the signal quality feedback comprises a processing system. In some aspects, means for determining a second signal quality associated with second beamformed communication based on the signal quality feedback comprises a processing system. In some aspects, means for calculating a difference between the first signal quality and the second signal quality comprises a processing system. In some aspects, means for determining whether the difference is greater than or equal to a threshold comprises a processing system. In some aspects, means for selecting a modulation and coding scheme for subsequent beamformed communication as a result of a determination that the difference is greater than or equal to the threshold comprises a processing system. In some aspects, means for determining that a different beam pattern has been selected for beamformed communication comprises a processing system.

In some aspects, an apparatus or any component of an apparatus may be configured to provide functionality as taught herein by, for example, manufacturing (e.g., fabricating) the apparatus or component so that it will provide the functionality, by programming the apparatus or component so that it will provide the functionality, or through the use of some other suitable configuring means.

Also, it should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art understand that information and signals may be represented using any of a variety of different technologies and techniques. For example, any data, instructions, commands, information, signals, bits, symbols, and chips referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such that the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising codes (e.g., executable by at least one computer) relating to one or more of the aspects of the disclosure. In some aspects a computer program product may comprise packaging materials.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A computer-readable media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer-readable medium (e.g., tangible media, computer-readable storage medium, etc.). In addition, in some aspects computer-readable medium may comprise transitory computer readable medium (e.g., comprising a signal). Combinations of the above should also be included within the scope of computer-readable media. It should be appreciated that a computer-readable medium may be implemented in any suitable computer-program product.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An apparatus for wireless communication, comprising:
a transceiver configured to receive signal quality feedback from another apparatus; and
a processing system configured to:
select a first modulation and coding scheme associated with a first range of signal quality specified by at least one rate table, wherein the at least one rate table maps the first range of signal quality to a first set of modulation and coding schemes and maps a second range of signal quality to a second set of modulation and coding schemes;
determine a first signal quality associated with a first communication that uses the first modulation and coding scheme, wherein the first signal quality is determined from the signal quality feedback;
determine a second signal quality associated with a second communication that uses the first modulation and coding scheme, wherein the second signal quality is determined from the signal quality feedback;
calculate a difference between the first signal quality and the second signal quality;
compare the difference to a threshold; and
invoke a modulation and coding scheme selection procedure if the comparison indicates that the difference is greater than or equal to the threshold, wherein the modulation and coding scheme selection procedure comprises a determination of whether to select a second modulation and coding scheme for a subsequent communication from the first set of modulation and coding schemes or from the second set of modulation and coding schemes.

2. The apparatus of claim 1, wherein:
the first signal quality comprises a first received signal strength indication measured by the other apparatus; and
the second signal quality comprises a second received signal strength indication measured by the other apparatus.

3. The apparatus of claim 1, wherein the at least one rate table specifies a plurality of ranges of signal quality including the first range and the second range, and each of the ranges is associated with set of modulation and coding schemes corresponding to a set of mutually exclusive rates, and wherein, to select the second modulation and coding scheme, the processing system is further configured to:
identify one of the ranges of signal quality that includes the second signal quality; and
identify a modulation and coding scheme from the set of modulation and coding schemes that is associated with the identified range of signal quality.

4. The apparatus of claim 3, wherein the identified modulation and coding scheme is one of the modulation and coding schemes of the set that is associated with a highest goodput value.

5. The apparatus of claim 1, wherein the at least one rate table comprises a plurality of rate tables, and wherein, to select the second modulation and coding scheme, the processing system is further configured to:
identify a rate table associated with a range of signal quality that includes the second signal quality, wherein the identified rate table is one of the plurality of rate tables; and
select the second modulation and coding scheme by use of the identified rate table.

6. The apparatus of claim 5, wherein the selected second modulation and coding scheme is one of the modulation and coding schemes of the identified rate table that is associated with a highest goodput value.

7. The apparatus of claim 1, wherein:
the processing system is further configured to determine that a different beam pattern has been selected for beamformed communication; and
the determination of the second signal quality is triggered as a result of the determination that a different beam pattern has been selected.

8. The apparatus of claim 7, wherein the determination that a different beam pattern has been selected is based on a determination, by a beam pattern search algorithm, that the different beam pattern is associated with higher signal quality than a beam pattern used for the first communication.

9. The apparatus of claim 1, wherein the receipt of the signal quality feedback from the other apparatus comprises receipt of received signal strength indications from a wireless node that receives beamformed signals for the first communication and the second communication.

10. The apparatus of claim 1, wherein the first, second, and subsequent communications comprise IEEE 802.11ad communications.

11. A method of wireless communication, comprising:
selecting a first modulation and coding scheme associated with a first range of signal quality specified by at least one rate table, wherein the at least one rate table maps the first range of signal quality to a first set of modulation and coding schemes and maps a second range of signal quality to a second set of modulation and coding schemes;
receiving signal quality feedback from an apparatus;
determining a first signal quality associated with a first communication that uses the first modulation and coding scheme, wherein the first signal quality is determined from the signal quality feedback;
determining a second signal quality associated with a second communication that uses the first modulation and coding scheme, wherein the second signal quality is determined from the signal quality feedback;
calculating a difference between the first signal quality and the second signal quality;
comparing the difference to a threshold; and
invoking a modulation and coding scheme selection procedure if the comparison indicates that the difference is greater than or equal to the threshold, wherein the modulation and coding scheme selection procedure comprises determining whether to select a second modulation and coding scheme for a subsequent communication from the first set of modulation and coding schemes or from the second set of modulation and coding schemes.

12. The method of claim 11, wherein:
the first signal quality comprises a first received signal strength indication measured by the apparatus; and
the second signal quality comprises a second received signal strength indication measured by the apparatus.

13. The method of claim 11, wherein the at least one rate table specifies a plurality of ranges of signal quality including the first range and the second range, and each of the ranges is associated with set of modulation and coding schemes corresponding to a set of mutually exclusive rates, and wherein the selection of the second modulation and coding scheme comprises:
identifying one of the ranges of signal quality that includes the second signal quality; and
identifying a modulation and coding scheme from the set of modulation and coding schemes that is associated with the identified range of signal quality.

14. The method of claim 13, wherein the identified modulation and coding scheme is one of the modulation and coding schemes of the set that is associated with a highest goodput value.

15. The method of claim 11, wherein the at least one rate table comprises a plurality of rate tables, and wherein the selection of the second modulation and coding scheme comprises:
identifying a rate table associated with a range of signal quality that includes the second signal quality, wherein the identified rate table is one of the plurality of rate tables; and
selecting the second modulation and coding scheme by use of the identified rate table.

16. The method of claim 15, wherein the selected second modulation and coding scheme is one of the modulation and coding schemes of the identified rate table that is associated with a highest goodput value.

17. The method of claim 11, further comprising determining that a different beam pattern has been selected for beamformed communication, wherein the determination of the second signal quality is triggered as a result of the determination that a different beam pattern has been selected.

18. The method of claim 17, wherein the determination that a different beam pattern has been selected is based on a determination, by a beam pattern search algorithm, that the different beam pattern is associated with higher signal quality than a beam pattern used for the first communication.

19. The method of claim 11, wherein the receipt of the signal quality feedback from the apparatus comprises receiving received signal strength indications from a wireless node that receives beamformed signals for the first communication and the second communication.

20. The method of claim 11, wherein the first, second, and subsequent communications comprise IEEE 802.11ad communications.

21. An apparatus for wireless communication, comprising:
means for selecting a first modulation and coding scheme associated with a first range of signal quality specified by at least one rate table, wherein the at least one rate table maps the first range of signal quality to a first set of modulation and coding schemes and maps a second range of signal quality to a second set of modulation and coding schemes;
means for receiving signal quality feedback from another apparatus;
means for determining a first signal quality associated with a first communication that uses the first modulation and coding scheme, wherein the first signal quality is determined from the signal quality feedback;
means for determining a second signal quality associated with a second communication that uses the first modulation and coding scheme, wherein the second signal quality is determined from the signal quality feedback;
means for calculating a difference between the first signal quality and the second signal quality;
means for comparing the difference to a threshold; and
means for invoking a modulation and coding scheme selection procedure if the comparison indicates that the difference is greater than or equal to the threshold, wherein the modulation and coding scheme selection procedure comprises a determination of whether to select a second modulation and coding scheme for a subsequent communication from the first set of modulation and coding schemes or from the second set of modulation and coding schemes.

22. The apparatus of claim 21, wherein:
the first signal quality comprises a first received signal strength indication measured by the other apparatus; and
the second signal quality comprises a second received signal strength indication measured by the other apparatus.

23. The apparatus of claim 21, wherein the at least one rate table specifies a plurality of ranges of signal quality including the first range and the second range, and each of the ranges is associated with set of modulation and coding schemes corresponding to a set of mutually exclusive rates, and wherein the selection of the second modulation and coding scheme comprises:
identifying one of the ranges of signal quality that includes the second signal quality; and
identifying a modulation and coding scheme from the set of modulation and coding schemes that is associated with the identified range of signal quality.

24. The apparatus of claim 23, wherein the identified modulation and coding scheme is one of the modulation and coding schemes of the set that is associated with a highest goodput value.

25. The apparatus of claim 21, wherein the at least one rate table comprises a plurality of rate tables, and wherein the selection of the second modulation and coding scheme comprises:
identifying a rate table associated with a range of signal quality that includes the second signal quality, wherein the identified rate table is one of the plurality of rate tables; and
selecting the second modulation and coding scheme by use of the identified rate table.

26. The apparatus of claim 25, wherein the selected second modulation and coding scheme is one of the modulation and coding schemes of the identified rate table that is associated with a highest goodput value.

27. The apparatus of claim 21, further comprising means for determining that a different beam pattern has been selected for beamformed communication, wherein the determination of the second signal quality is triggered as a result of the determination that a different beam pattern has been selected.

28. The apparatus of claim 27, wherein the determination that a different beam pattern has been selected is based on a determination, by a beam pattern search algorithm, that the different beam pattern is associated with higher signal quality than a beam pattern used for the first communication.

29. The apparatus of claim 21, wherein the receipt of the signal quality feedback from the other apparatus comprises receiving received signal strength indications from a wireless node that receives beamformed signals for the first communication and the second beamformed communication.

30. The apparatus of claim 21, wherein the first, second, and subsequent communications comprise IEEE 802.1 lad communications.

31. A non-transitory computer-readable medium comprising codes executable to:
select a first modulation and coding scheme associated with a first range of signal quality specified by at least one rate table, wherein the at least one rate table maps the first range of signal quality to a first set of modulation and coding schemes and maps a second range of signal quality to a second set of modulation and coding schemes;
receive signal quality feedback from an apparatus;
determine a first signal quality associated with a first communication that uses the first modulation and coding scheme, wherein the first signal quality is determined from the signal quality feedback;
determine a second signal quality associated with a second communication that uses the first modulation and coding scheme, wherein the second signal quality is determined from the signal quality feedback;
calculate a difference between the first signal quality and the second signal quality;
compare the difference to a threshold; and
invoke a modulation and coding scheme selection procedure if the comparison indicates that the difference is greater than or equal to the threshold, wherein the modulation and coding scheme selection procedure comprises a determination of whether to select a second modulation and coding scheme for a subsequent communication from the first set of modulation and coding schemes or from the second set of modulation and coding schemes.

32. A wireless node, comprising:
an antenna system;
a transceiver configured to receive, via the antenna system, signal quality feedback from an apparatus; and
a processing system configured to:
select a first modulation and coding scheme associated with a first range of signal quality specified by at least one rate table, wherein the at least one rate table maps the first range of signal quality to a first set of modulation and coding schemes and maps a second range of signal quality to a second set of modulation and coding schemes;
determine a first signal quality associated with a first communication that uses the first modulation and coding scheme, wherein the first signal quality is determined from the signal quality feedback;
determine a second signal quality associated with a second communication that uses the first modulation and coding scheme, wherein the second signal quality is determined from the signal quality feedback;
calculate a difference between the first signal quality and the second signal quality;
compare the difference to a threshold; and
invoke a modulation and coding scheme selection procedure if the comparison indicates that the difference is greater than or equal to the threshold, wherein the modulation and coding scheme selection procedure comprises a determination of whether to select a second modulation and coding scheme for a subsequent communication from the first set of modulation and coding schemes or from the second set of modulation and coding schemes.

* * * * *